United States Patent
Cheng

[19]

[11] Patent Number: 6,157,537
[45] Date of Patent: Dec. 5, 2000

[54] DATA PROCESSING APPARATUS HAVING A LIQUID HEAT-DISSIPATING SYSTEM

[75] Inventor: Ted Cheng, Hsinchu, Taiwan

[73] Assignee: GETAC Corporation, Taiwan

[21] Appl. No.: 09/401,913

[22] Filed: Sep. 23, 1999

[51] Int. Cl.[7] .................................................. H05K 7/20
[52] U.S. Cl. ..................... 361/699; 165/80.3; 361/687
[58] Field of Search .................................. 165/80.2, 80.3;
174/15.1, 16.1; 257/714; 361/687–689,
690, 698–699, 702, 703, 704, 707

[56] References Cited

U.S. PATENT DOCUMENTS

| | | | |
|---|---|---|---|
| 5,430,609 | 7/1995 | Kikinis | 361/687 |
| 5,734,550 | 3/1998 | Penniman et al. | 361/687 |
| 5,835,348 | 11/1998 | Ishida | 361/699 |
| 6,078,495 | 6/2000 | Cipolla et al. | 361/687 |

*Primary Examiner*—Gregory Thompson
*Attorney, Agent, or Firm*—Arnold White & Durkee

[57] ABSTRACT

A data processing apparatus having a liquid heat-dissipating system includes a central processing unit (CPU), a housing to receive the CPU, and a heat conductive member. The housing has a top wall and a top opening in the wall immediately above the CPU. The heat conductive member is mounted on the wall to cover the opening and to transfer heat produced by the CPU from an inside of the housing to an outside of the housing, and has a receiving cavity adapted for receiving a cooling liquid.

6 Claims, 3 Drawing Sheets

DATA PROCESSING APPARATUS HAVING A LIQUID HEAT-DISSIPATING SYSTEM

BACKGROUND OF THE INVENTION

1. Field of the Invention

The invention relates to a data processing apparatus, more particularly to a data processing apparatus having a liquid heat-dissipating system.

2. Description of the Related Art

Referring to FIG. 1, a conventional heat-dissipating unit for a data processing apparatus, such as a computer suited for outdoor use, is shown to comprise a heat-dissipating plate 11 mounted on an outer face 10 of a central processing unit (CPU) of the data processing apparatus. The heat-dissipating plate 11 is in contact with the CPU so that the heat-dissipating plate 11 can transfer heat produced by the CPU from an inside of the data processing apparatus to an outside of the data processing apparatus. The drawback of the conventional heat-dissipating unit resides in its limited heat dissipating efficiency in view of its limited size. If the size of the heat-dissipating plate 11 is increased to increase in turn the heat-dissipating area, a corresponding increase in the size of the data processing apparatus is encountered and can effect portability of the latter.

SUMMARY OF THE INVENTION

Therefore, the main object of the present invention is to provide a data processing apparatus having a compact liquid heat-dissipating system.

According to the present invention, a data processing apparatus having a liquid heat-dissipating system includes a central processing unit (CPU), a housing to receive the CPU, and a heat conductive member. The housing has a top wall and a top opening in the wall immediately above the CPU. The heat conductive member is mounted on the wall to cover the opening and to transfer heat produced by the CPU from an inside of the housing to an outside of the housing, and has a receiving cavity adapted for receiving a cooling liquid.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
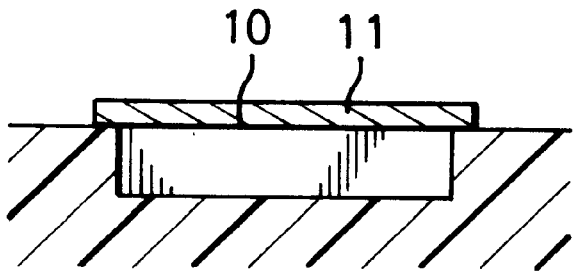
FIG. 1 is a fragmentary sectional view showing a conventional heat-dissipating unit for a data processing apparatus.
Figure 2:
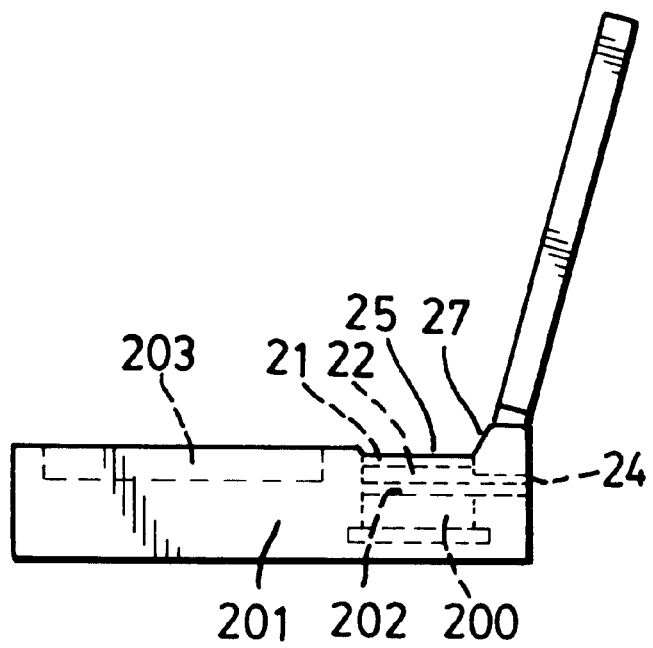
FIG. 2 is a schematic view showing the preferred embodiment of a data processing apparatus having a liquid heat-dissipating system of this invention.
Figure 3:
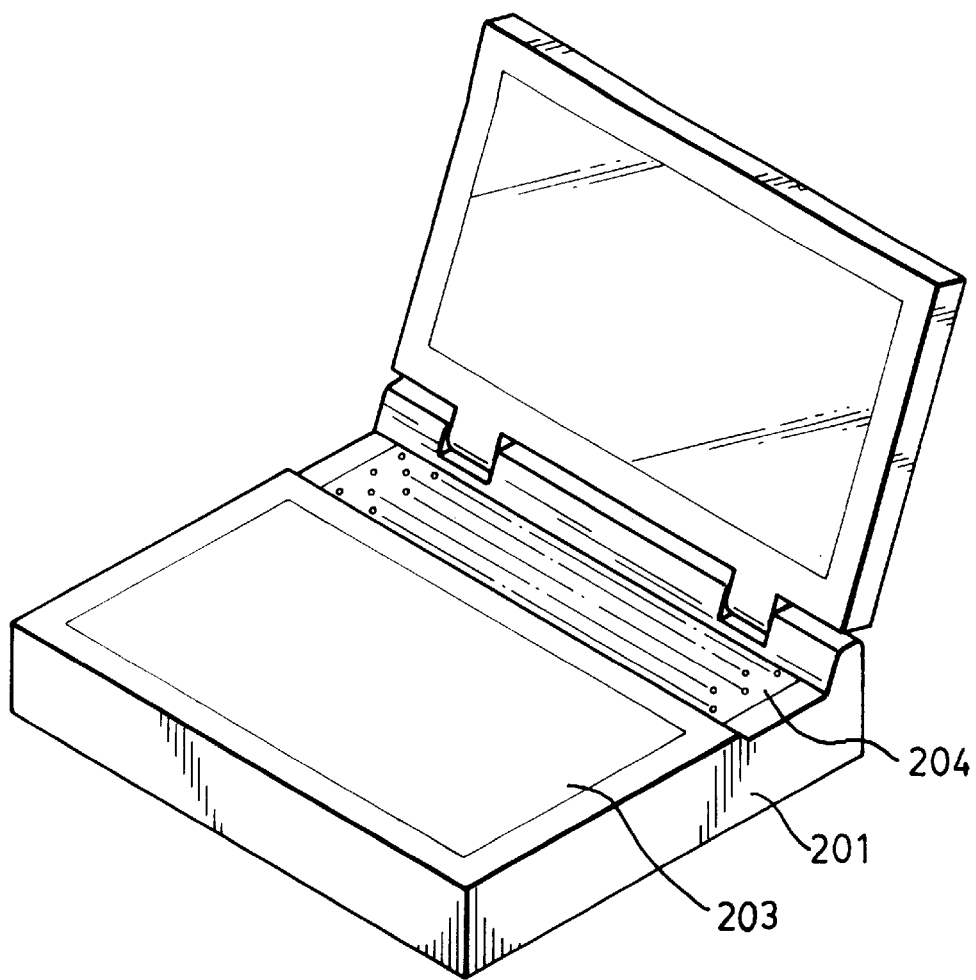
FIG. 3 is a perspective schematic view showing the preferred embodiment of a data processing apparatus having a liquid heat-dissipating system of this invention.
Figure 4:
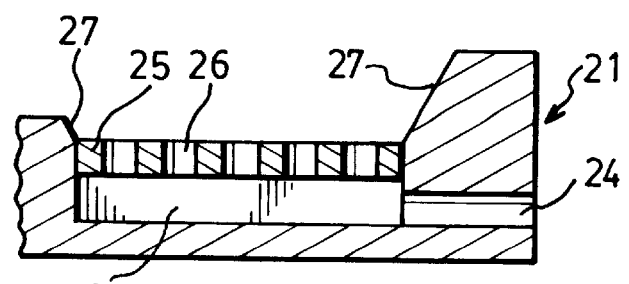
FIG. 4 is a sectional schematic view showing a heat conductive member of the preferred embodiment of this invention.

Referring to FIGS. 2, 3, and 4, according to the preferred embodiment of this invention, a data processing apparatus having a liquid heat-dissipating system includes a central processing unit (CPU) 200, a housing 201 to receive the CPU 200, and a heat conductive member 21. The housing 201 has a top wall 203 and a top opening 204 in the wall 203 immediately above the CPU 200. The heat conductive member 21 is mounted on the wall 203 and is in contact with the CPU 200 to cover the opening 204 and to transfer heat produced by the CPU 200 from an inside of the housing 201 to an outside of the housing 201. The heat conductive member 21 has a receiving cavity 22 adapted for receiving a cooling liquid, such as rain water, and an outlet channel 24 communicated with the cavity 22 and adapted to discharge the cooling liquid from the cavity 22. The conductive member 21 has a top cover 25 formed with a plurality of through holes 26 adapted for passage of the cooling liquid into the cavity 22. The cover 25 can thus serve as a strainer to prevent foreign objects from entering into the cavity 22.

The CPU 200 has a top surface 202 and the periphery of the top surface 202 is provided with a water-sealing ring (not shown) before the conductive member 21 is placed in contact with the CPU 200 to avoid leakage of the cooling liquid in the cavity 22 into the housing 201. The conductive member 21 has inclined faces 27 to guide liquid flow into the cavity 22, as shown in FIG. 4.

Figure 5:
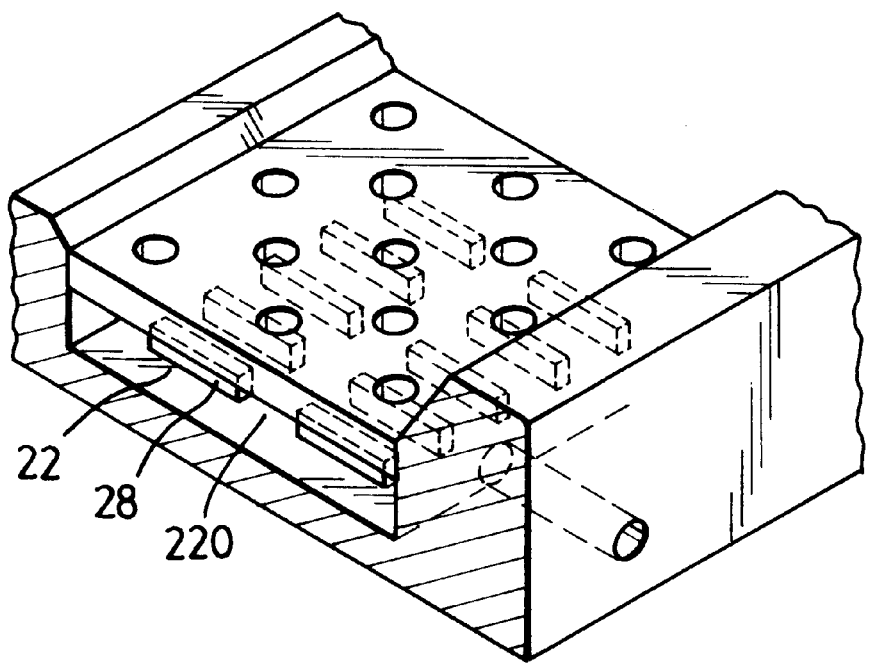
FIG. 5 is a fragmentary perspective view showing an alternative configuration of the heat conductive member used in the preferred embodiment of this invention.

As shown in FIG. 5, in an alternative configuration, the conductive member 21 has a plurality of heat-dissipating fins 28 disposed on a bottom 220 of the cavity 22 to increase the heat-dissipating efficiency.

Figure 6:
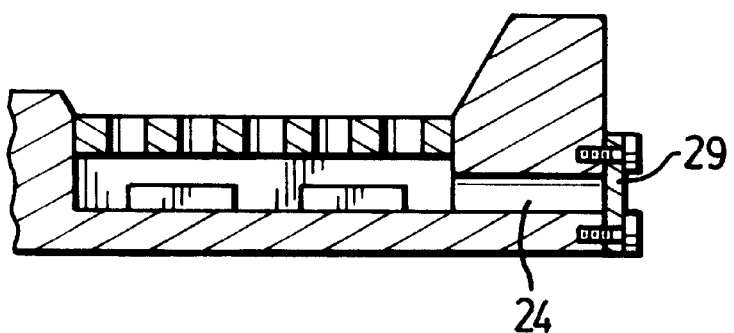
FIG. 6 is a sectional schematic view showing another configuration of the heat conductive member used in the preferred embodiment of this invention.

As shown in FIG. 6, in another configuration, a valve gate 29 is mounted on the conductive member 21 and is fixed thereon with the use of screws. The valve gate 29 is adapted to be operated so as to control the discharge of the cooling liquid from the cavity 22.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A data processing apparatus having a liquid heat-dissipating system, comprising:

a central processing unit (CPU);

a housing to receive said CPU, said housing having a top wall and a top opening in said wall immediately above said CPU; and a heat conductive member mounted on said wall to cover said opening and to transfer heat produced by said CPU from an inside of said housing to an outside of said housing, said conductive member having a receiving cavity adapted for receiving a cooling liquid.

2. The data processing apparatus as claimed in claim 1, wherein said conductive member is in contact with said CPU.

3. The data processing apparatus as claimed in claim 1, wherein said conductive member has an outlet channel communicated with said cavity and adapted to discharge the cooling liquid from said cavity.

4. The data processing apparatus as claimed in claim 3, further comprising a valve gate mounted on said conductive member and adapted to be operated so as to control the discharge of the cooling liquid from said cavity.

5. The data processing apparatus as claimed in claim 1, wherein said conductive member has a top cover formed with a plurality of through holes adapted for passage of the cooling liquid into said cavity.

6. The data processing apparatus as claimed in claim 1, wherein said conductive member has a plurality of heat-dissipating fins disposed on a bottom of said cavity.

* * * * *